United States Patent
Leisner

(10) Patent No.: US 8,662,798 B2
(45) Date of Patent: Mar. 4, 2014

(54) TOOL FOR TURN/TURN BROACHING OR EXTERNAL MILLING

(75) Inventor: Jürgen Leisner, Cadolzburg (DE)

(73) Assignee: Kennametal Inc., Latrobe, PA (US)

( * ) Notice: Subject to any disclaimer, the term of this patent is extended or adjusted under 35 U.S.C. 154(b) by 206 days.

(21) Appl. No.: 13/411,796

(22) Filed: Mar. 5, 2012

(65) Prior Publication Data
US 2012/0230794 A1 Sep. 13, 2012

(30) Foreign Application Priority Data
Mar. 12, 2011 (DE) .......................... 10 2011 013 812

(51) Int. Cl.
*B23C 5/22* (2006.01)
*B23D 37/00* (2006.01)

(52) U.S. Cl.
USPC ................... 407/46; 407/94; 407/41; 407/47; 407/49

(58) Field of Classification Search
USPC ..................... 407/41, 46, 47, 49, 94
See application file for complete search history.

(56) References Cited

U.S. PATENT DOCUMENTS

| | | | | | |
|---|---|---|---|---|---|
| 1,938,717 | A | * | 12/1933 | Oxford | 407/79 |
| 3,707,748 | A | * | 1/1973 | Price et al. | 407/17 |
| 4,462,725 | A | * | 7/1984 | Satran et al. | 407/92 |
| 4,993,889 | A | * | 2/1991 | Kelm | 407/15 |
| 5,395,186 | A | * | 3/1995 | Qvart | 407/46 |
| 5,800,079 | A | * | 9/1998 | Qvarth | 407/46 |
| 6,030,153 | A | * | 2/2000 | Votsch et al. | 407/36 |
| 2011/0150584 | A1 | * | 6/2011 | Hakamada | 407/46 |

FOREIGN PATENT DOCUMENTS

WO 2009135555 A1 11/2009

* cited by examiner

*Primary Examiner* — Will Fridie, Jr.
(74) *Attorney, Agent, or Firm* — Larry R. Meenan, Esq.

(57) ABSTRACT

A tool for the turn/turn broaching or external milling of a workpiece is disclosed. The tool comprises a disk-shaped broaching wheel or at least one segment of such a broaching wheel. In each case, at least one cutting-tip holding fixture in each case for receiving a cutting tip is provided on the end faces of the broaching wheel or segment laterally adjoining a circumferential surface. On at least one of the two end faces, a cutting-tip holding fixture is formed in a cartridge, which is axially adjustable with respect to the broaching wheel or segment by an axial clamping wedge. The cartridge is designed in such a way that it at least partially covers the axial clamping wedge in a direction towards the circumferential surface.

13 Claims, 5 Drawing Sheets

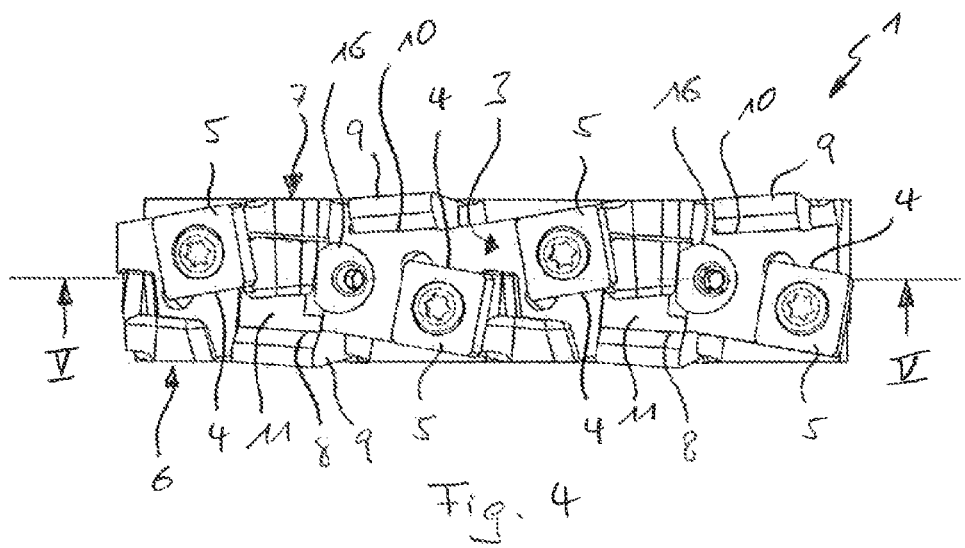
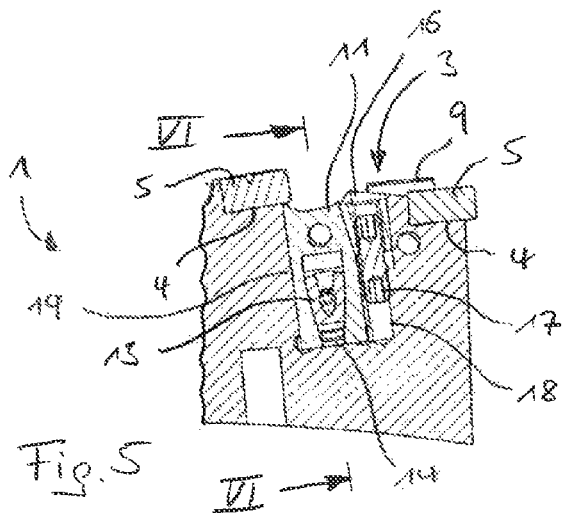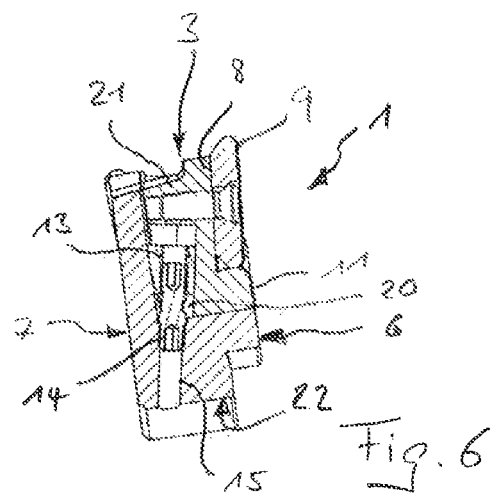
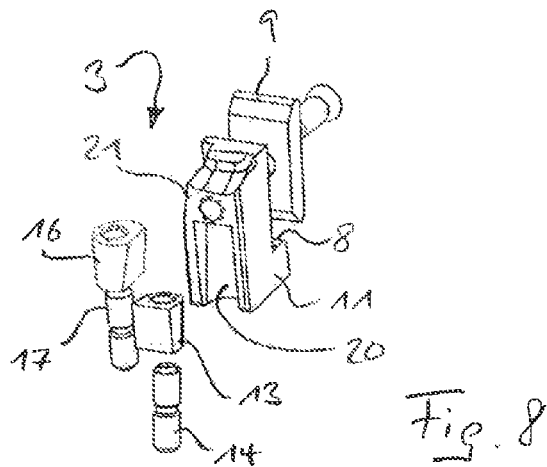

TOOL FOR TURN/TURN BROACHING OR EXTERNAL MILLING

CLAIM TO PRIORITY

This application is a National entry application of German Application No. 102011013812.9, filed on Mar. 12, 2011, the entire contents of which is incorporated herein by reference.

FIELD OF THE INVENTION

The invention relates to a tool for the turn/turn broaching or external milling of a workpiece.

BACKGROUND OF THE INVENTION

Turn/turn broachers are used particularly for the machining of crankshafts. Such a turn/turn broacher is formed essentially by a disk-shaped broaching wheel which is fitted with cutting tips on the circumferential surface and in a region of the end faces which is contiguous to this. The broaching wheel of a turn/turn broacher is in this case usually operated by being rotated at high speed about its axis and is advanced transversely to this axis towards the slowly rotating workpiece. Conversely to this principle of procedure, however, it is also possible to rotate the broaching wheel slowly and the workpiece quickly.

The broaching wheel may be produced in one piece. The broaching wheel known from WO 2009/135555 A1 is formed, contrary to this, from a plurality of exchangeable segments. One of these segments in this case carries three cutting-tip holding fixtures into which (interchangeable) cutting tips can be inserted or are inserted. A (circumferential) cutting-tip holding fixture is arranged centrally on the circumferential surface of the broaching wheel. The other two cutting-tip holding fixtures are offset axially opposite to one another with respect to this circumferential cutting-tip holding fixture, so that each of these other two cutting-tip holding fixtures is contiguous in each case to one of the two end faces of the broaching wheel.

These two (end-face) cutting-tip holding fixtures are not formed directly on the broaching-wheel segment, but instead in each case in a cartridge which is adjustable in the axial direction of the broaching wheel with respect to the broaching-wheel segment.

The axial adjustment of these two cartridges here takes place in each case by means of a clamping wedge. These two clamping wedges and the in each case associated setscrew are in this case openly accessible from the circumferential surface of the broaching wheel, in order to make simple adjustment possible. The disadvantage of this, however, is that the clamping wedges and their setscrews are exposed to severe load caused by the chips occurring in this region. In particular, the clamping wedges and setscrews often become clogged by the chips which occur, with the result that the further readjustment of the cartridges is impeded or is even made impossible.

SUMMARY OF THE INVENTION

The object on which the invention is based is to specify a tool, improved with regard to this problem, for the turn/turn broaching or external milling of a workpiece.

This object is achieved, according to the invention, by means of the features of Claim 1. Accordingly, the tool comprises a broaching wheel or at least one segment of such. In this case, at least one cutting-tip holding fixture for a cutting tip is arranged in each case in a region of the two end faces of the broaching wheel or segment which adjoins a circumferential surface of the broaching wheel or segment. These cutting-tip holding fixtures are arranged in such a way that a cutting tip inserted therein cuts, at least also, on the respectively assigned end face of the broaching wheel. The above-described cutting-tip holding fixtures are therefore designated below as "end-face cutting-tip holding fixtures". In addition to these end-face cutting-tip holding fixtures, the broaching wheel or broaching-wheel segment optionally has arranged on it at least one further cutting-tip holding fixture, into which an associated cutting tip can be inserted at a distance from the two end faces and which is designated below as the "circumferential cutting-tip holding fixture".

The or each cutting-tip holding fixture arranged at least on one of the two end faces of the broaching wheel or broaching-wheel segment is not formed directly on the broaching wheel or broaching-wheel segment, but instead in a cartridge which is adjustable in the axial direction with respect to the broaching wheel or broaching-wheel segment.

The "axial direction" is in this case that direction which is oriented parallel to the axis of rotation of the broaching wheel. In the case of a broaching-wheel segment, the definition of the axial direction refers to the mounting position of the segment on the broaching wheel. In the case of a broaching-wheel segment, the terms "circumferential surface" and "end face" likewise refer to the mounting position of the segment. Those surfaces are therefore designated as the "circumferential surface" and "end face" of the segment and lie on the circumferential surface or on an end face of the broaching wheel in the mounting position of the segment.

For adjustment and axial adjustment, the or each cartridge is assigned a clamping wedge which acts on the cartridge in the axial direction and which is therefore designated below as an "axial clamping wedge". According to the invention, the or each cartridge is designed in such a way that it at least partially covers the associated axial clamping wedge towards the circumferential surface of the broaching wheel or broaching-wheel segment. In the preferred version, for this purpose, the or each cartridge has a roof-like projection, by means of which it is pushed completely or partially over the associated axial clamping wedge and its setscrew in the mounted state.

By the or each cartridge being designed according to the invention, the situation is prevented in an especially simple way where the associated axial clamping wedge and its setscrew lie open unprotected, on the circumferential surface of the broaching wheel. Stressing and blocking of the axial clamping wedge by the chips occurring during the broaching operation are thus reliably ruled out.

In order to ensure simple, quick and accurate axial adjustment of the associated cartridge despite the fact that the or each axial clamping wedge is concealed, in an advantageous development of the invention an orifice is provided in the roof region with which the cartridge covers the axial clamping wedge, and an actuating tool can be introduced through said orifice in order to adjust the axial clamping wedge (more specifically, its setscrew). In order to avoid a situation where chips, in turn, penetrate through this orifice into the region of the axial clamping wedge, this orifice is expediently dimensioned as small as possible. In particular, the orifice is dimensioned to be just large enough to ensure that the actuating tool can be advanced to the axial clamping wedge and its setscrew. In any event, the orifice is dimensioned substantially smaller than the diameter of the clamping wedge.

Alternatively or additionally, likewise in order to allow simple, quick and accurate axial adjustment of the or each cartridge, there is provision for designing the broaching wheel or broaching-wheel segment in such a way that the setscrew of the or each axial clamping wedge is accessible from one of the end faces of the broaching wheel or segment. In particular, the or each bore by means of which the setscrew of an axial clamping wedge is screwed in the broaching wheel or segment is prolonged in the radially inward direction, so that this bore issues in one of the end faces of the broaching wheel or segment.

In order to simplify both the production of the broaching wheel or segment and its setting, there is preferably provision whereby axially adjustable cartridges for forming the or each end-face cutting-tip holding fixture are arranged on only one of the two end faces, whereas the or each end-face cutting-tip holding fixture is introduced directly into the broaching wheel or segment on the other end face. If present, preferably the or each circumferential cutting-tip holding fixture is also formed directly in the broaching wheel or segment.

In the context of the invention, there may be provision whereby the or each cartridge, if appropriate independently of its axial position, completely covers the associated axial clamping wedge. However, sufficiently good protection for the axial clamping wedges against the chips which occur is achieved even when the or each cartridge covers the associated axial clamping wedge over at least 90% of the clamping-wedge diameter (measured in the axial direction at the radially outer margin of the clamping wedge).

In an expedient version, the or each axial clamping wedge acts merely as an abutment for the associated cartridge, but does not serve for fixing the cartridge to the broaching wheel or broaching-wheel segment. Instead, in an expedient version, this fixing is carried out by a further clamping wedge which acts on the cartridge in the tangential direction of the broaching wheel and which, in the mounted state, braces this cartridge between itself and an opposite abutment of the broaching wheel or segment.

In the case of a broaching-wheel segment, like the axial direction, the tangential direction also refers to the intended mounting position of the segment on the broaching wheel. The or each clamping wedge acting on the cartridge in the tangential direction is designated as a "tangential clamping wedge" in order to delimit it from the axial clamping wedge described above.

In the context of the invention, the broaching wheel may be formed in one part or comprise a plurality of, if appropriate, exchangeable segments. In the preferred version of the invention, the broaching wheel comprises a central basic body and a ring-shaped segment which is mountable or mounted on the latter and which is formed in the way described above. Instead of a single segment closed in the form of a ring, a plurality of segments, each in the form of a ring segment, may also be provided, at least one of which is formed in the way described above.

BRIEF DESCRIPTION OF THE DRAWINGS

Exemplary embodiments of the invention are explained in more detail below by means of a drawing in which:

FIG. 4 shows a top view of a circumferential surface of the broaching-wheel segment according to FIGS. 1 to 3, FIG. 5 shows a cross section V-V according to FIG. 4 through the broaching-wheel segment there, FIG. 6 shows a cross section VI-VI according to FIG. 5 through the broaching-wheel segment there, FIG. 8 shows a perspective illustration of a cartridge, insertable into the broaching-wheel segment, for the axially adjustable holding of a cutting tip, and two clamping wedges for the axial adjustment and fixing of the cartridge.

Parts corresponding to one another are always given the same reference symbols in all the figures.

DETAILED DESCRIPTION OF THE INVENTION

FIGS. 1 to 9 show in the form of a detail a segment 1 of a broaching wheel 2 for a turn/turn broacher.

Figure 1:
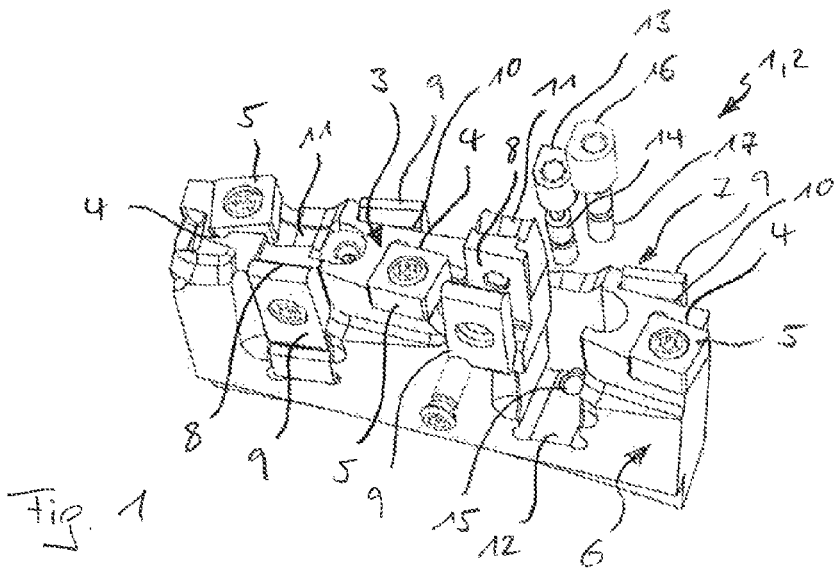
FIGS. 1-3 show different perspective illustrations of a segment of a broaching wheel for a turn/turn broacher in the partly mounted state.
Figure 2:
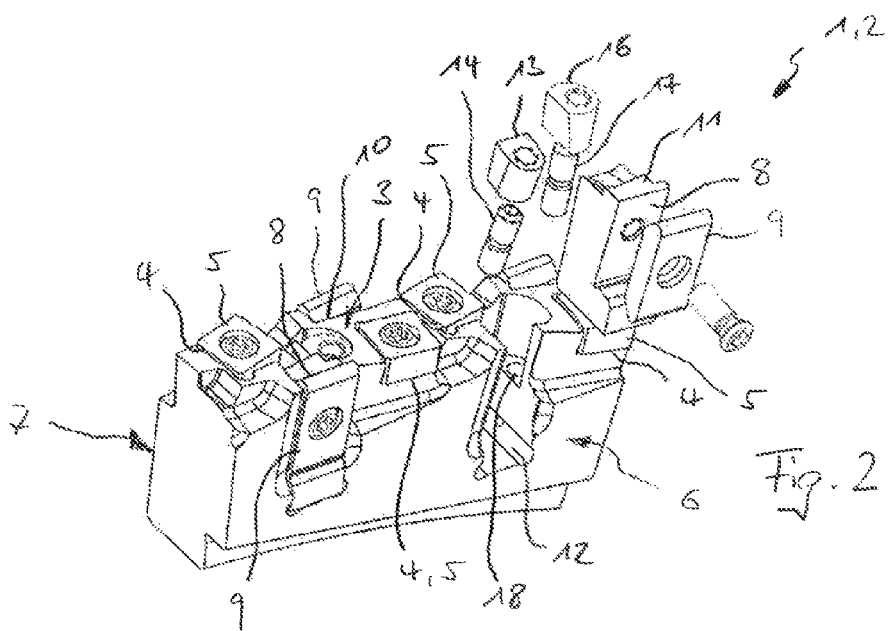
Figure 3:
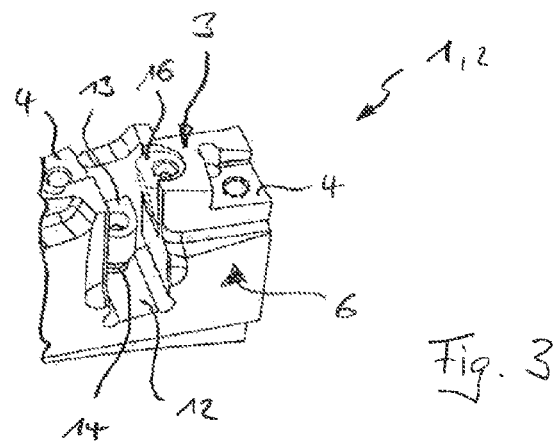
Figure 7:
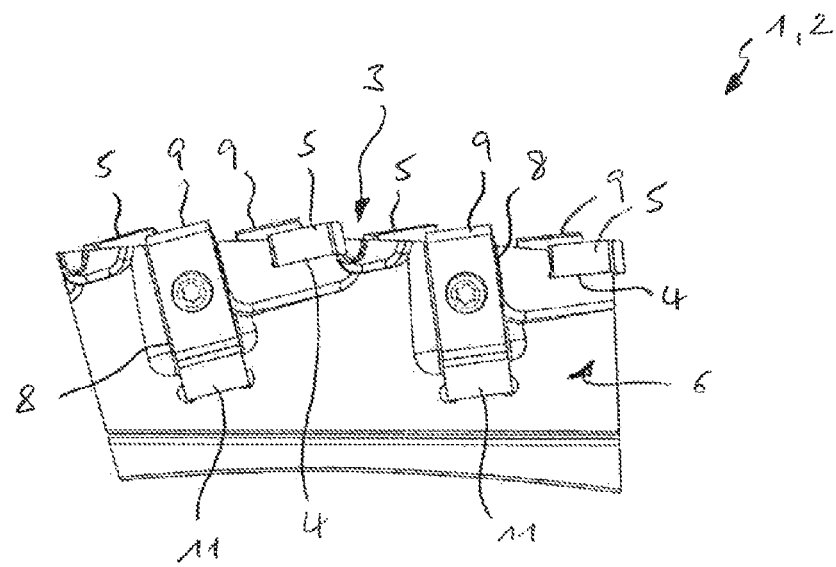
FIG. 7 shows a top view of an end face of the broaching-wheel segment according to FIGS. 1 to 6.

A radially outer face of the annular segment 1 is designated as a circumferential surface 3. On this circumferential surface 3, the segment 1 is provided with a multiplicity of (cutting-tip) holding fixtures 4, into each of which an eightfold (indexable) cutting tip 5 can be inserted, so that the square base of these cutting tips 5 is in each case oriented approximately parallel to the circumferential surface 3. FIGS. 1, 2, 4 to 6 and 7 show the segment 1 with inserted indexable cutting tips 5. FIG. 3 shows two holding fixtures 4 with the cutting tip 5 removed.

As is clear particularly from FIG. 4, the cutting tips 5 are positioned in the holding fixtures 4 in such a way that the cutting tips 5 are arranged only within the circumferential surface 3 and therefore do not project laterally beyond this circumferential surface 3. The cutting tips 5 are therefore designated as "circumferential" cutting tips. The holding fixtures 4 are also designated correspondingly as "circumferential" (cutting-tip) holding fixtures.

The surfaces of the segment 1 which laterally adjoin the circumferential surface 3 are designated as end faces 6 and 7. In a near-circumference region of the end face 6, a multiplicity of (cutting-tip) holding fixtures 8 for further indexable cutting tips 9 are provided on the segment 1. Likewise, a multiplicity of (cutting-tip) holding fixtures 10 for further indexable cutting tips 9 are also arranged in a region of the end face 7 which is contiguous to the circumferential surface 3. The indexable cutting tips 9 in each case insertable into the holding fixtures 8 and 10 are elongate twofold indexable cutting tips which are seated with their rectangular base in the holding fixtures 8 and 10 in an orientation approximately parallel to the end faces 6 and 7. The indexable cutting tips 9 are therefore designated as "end-face" cutting tips. The holding fixtures 8 and 10 are designated correspondingly as "end-face" (cutting-tip) holding fixtures.

FIGS. 1 to 7 show the segment 1 merely as a detail. In actual fact, the segment 1 has an annularly closed form which extends over the entire circumference of the broaching wheel 2. The sequence of the cutting-tip holding fixtures 4, 8 and 10 which is shown in FIGS. 1 to 7 is in this case continued periodically around the circumference of the segment 1 in a uniform recurring pattern.

Like the circumferential holding fixtures 4, the holding fixtures 10 introduced into the end face 7 are also formed directly on the segment 1 and therefore directly on the broaching wheel 2. In contrast to this, each of the holding fixtures 8 is formed in an assigned cartridge 11 which can be inserted as an insert into a matching recess 12 of the segment 1.

To adjust the axial position of the cartridge 11 with respect to the segment 1, each cartridge 11 is assigned an (axial) clamping wedge 13 which is screwed by means of an associated setscrew 14 in a bore 15 at the bottom of the recess 12. The clamping wedge 13 in this case serves as an abutment which limits the axial push-in depth of the cartridge 11 in the recess 12. An in each case further (tangential) clamping wedge 16 which is assigned to each cartridge 11 and which is screwed in an assigned bore 18 at the margin of the recess 12 by means of an assigned setscrew 17 serves for fixing the cartridge 11 to the segment 1. When the clamping wedge 16 is screwed in, the cartridge 11 is in this case clamped between the clamping wedge 16 and an opposite abutment face 19 (FIG. 5) of the segment 1.

As is clear particularly from FIGS. 6 and 8, with the cartridge 11 inserted each axial clamping wedge 13 is seated in a recess 20 of the latter. This recess 20 is closed off towards the circumferential surface 3 by means of a roof region 21. With the cartridge 11 inserted, the associated axial clamping wedge 13 is therefore completely or at least virtually completely covered towards the circumferential surface 3 by the roof region 21 of the cartridge 11.

In the above-described first embodiment of the invention, the roof region 21 of the cartridge 11 is completely closed towards the circumferential surface 3. With the cartridge 11 introduced, therefore, the axial clamping wedge 13 and its setscrew 14 are no longer accessible from the circumferential surface 3. So that the clamping wedge 13 can nevertheless be adjusted, without the cartridge 11 having to be removed, in this embodiment the bore 15 assigned to the setscrew 14 is prolonged beyond the depth necessary for screwing in the setscrew 14, so that the bore 15 issues on an inner face 22 of the segment 1, from where the setscrew 14 can be reached by means of a suitable actuating tool, for example a screwdriver or hexagon wrench.

Figure 9:
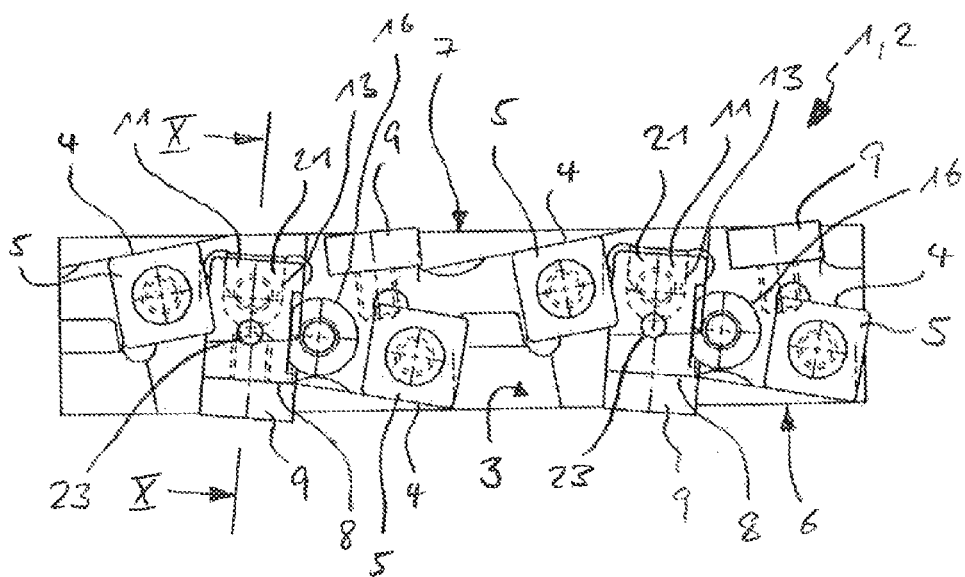
FIG. 9 shows an illustration according to FIG. 4 of a second embodiment of the broaching-wheel segment.
Figure 10:
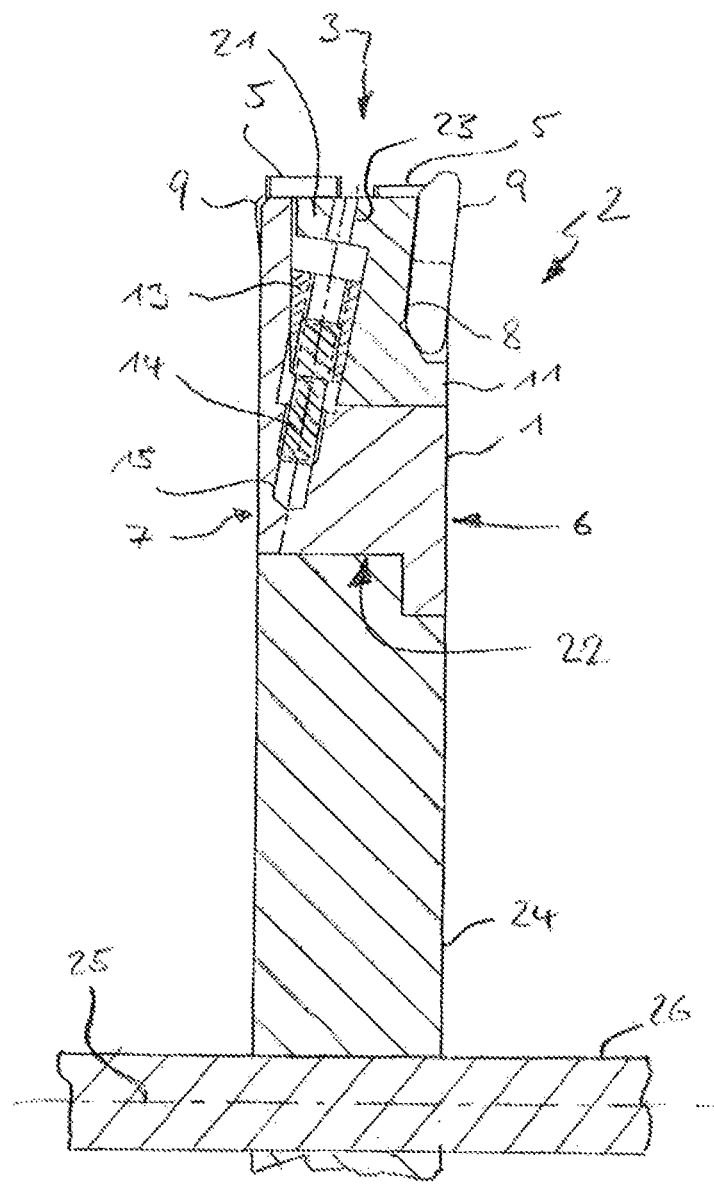
FIG. 10 shows a cross section X-X according to FIG. 9 through the broaching-wheel segment there in its mounting position on a basic body of the broaching wheel.

FIGS. 9 and 10 show a second embodiment of the segment 1. This second embodiment is identical to the above-described version, unless described otherwise below.

Contrary to the latter version, in the version according to FIGS. 9 and 10 an orifice 23 is introduced in the roof region 21 of each cartridge 11, and the actuating tool can be led through said orifice to the setscrew 14 from the circumferential surface 3. The orifice 23 is in this case adapted to the diameter of the actuating tool. In particular, said orifice is dimensioned narrowly, such that the actuating tool can still just be led through. The orifice 23 therefore has a diameter which appreciably undershoots the diameter of the axial clamping wedge 13, as measured in the axial direction at the radially upper end.

Since the setscrew 14 is accessible through the orifice 23 from the circumferential surface 3, in the version according to FIGS. 9 and 10 the bore 15 may be designed as a blind-hole bore and correspondingly be closed at its radially inner end.

As is clear from FIG. 10, the segment 1 is placed circumferentially in its mounting state onto a basic body 24 which forms the center of the broaching wheel 2 and which is coupled to a drive spindle 26 for driving the broaching wheel 2 in rotation about an axis of rotation 25.

Figure 11:
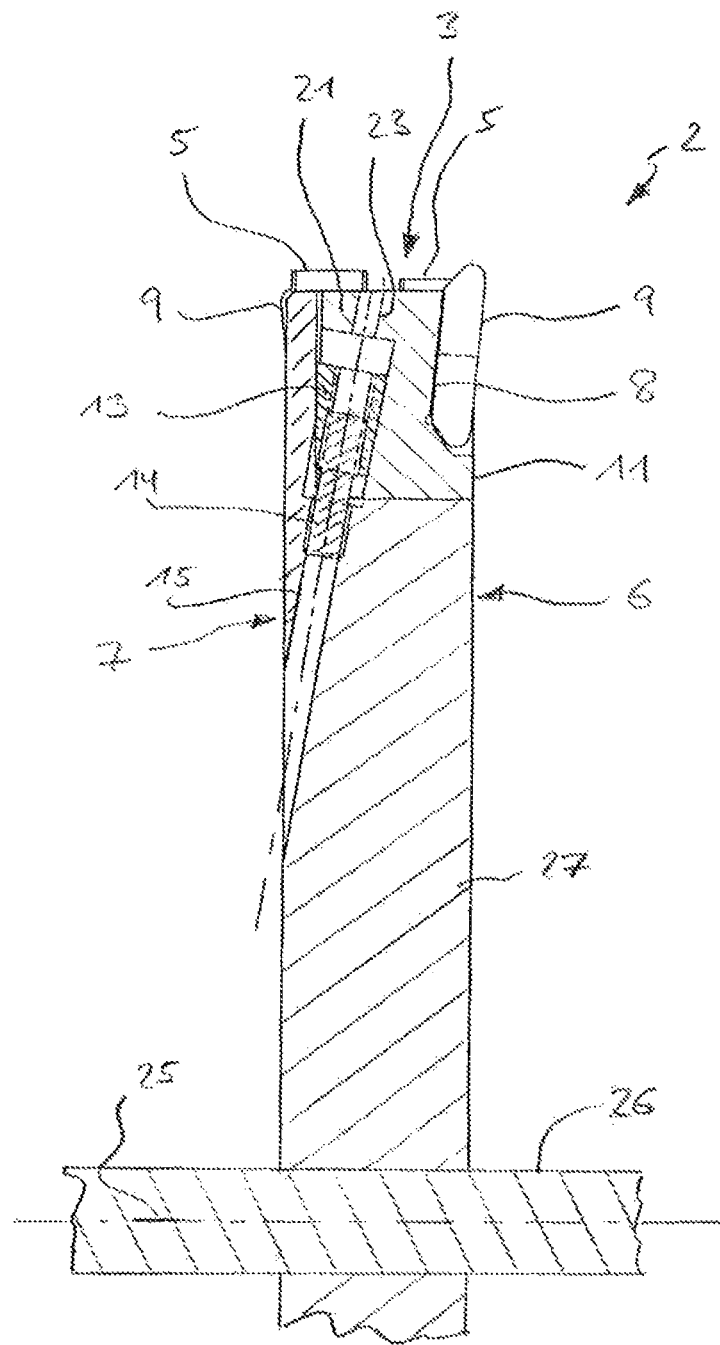
FIG. 11 shows an illustration according to FIG. 10 of the broaching wheel in a further embodiment.

FIG. 11 shows a modified embodiment of the broaching wheel 2. This is again essentially identical to the embodiment described above. However, according to FIG. 11, the broaching wheel 2 is produced in one piece. The segment 1 and the basic body 24 of the version illustrated in FIGS. 9 and 10 are thus integrated in the version according to FIG. 11 to form a one-piece wheel body 27.

The individual features of the three exemplary embodiments described above can be combined freely with one another.

What is claimed is:

1. A tool for turn/turn broaching or external milling of a workpiece, the tool comprising a disk-shaped broaching wheel having two end faces laterally adjoining a circumferential surface of the broaching wheel, each end face having at least one cutting-tip holding fixture for holding a cutting tip, each cutting-tip holding fixture including a cartridge that is axially adjustable with respect to the broaching wheel by means of an axial clamping wedge, wherein the cartridge at least partially covers the axial clamping wedge in a direction towards the circumferential surface.

2. The tool as claimed in claim 1, wherein the cartridge includes a roof region that projects beyond the axial clamping wedge, the roof region having an orifice that is narrow in comparison with an outer diameter of the axial clamping wedge, the orifice capable of accepting an actuating tool for adjusting the axial clamping wedge.

3. The tool as claimed in claim 1, wherein the axial clamping wedge is accessible from one of the two end faces of the broaching wheel in order to adjust the axial clamping wedge by means of an actuating tool.

4. The tool as claimed in claim 1, wherein one of the cutting-tip holding fixtures is formed on the cartridge on one of the two end faces, and wherein another one of the cutting-tip holding fixtures is formed directly on the broaching wheel on the other one of the two end faces.

5. The tool as claimed in claim 1, wherein the cartridge covers the axial clamping wedge over at least 90% of an outside diameter of clamping wedge as measured in the axial direction.

6. The tool as claimed in claim 1, wherein the cartridge is secured to the broaching wheel by means of a tangential clamping wedge acting on the cartridge in a tangential direction.

7. The tool as claimed in claim 1, wherein the broaching wheel further comprises a basic body and at least one segment that is mounted circumferentially on the basic body.

8. A tool for turn/turn broaching or external milling of a workpiece, the tool comprising a disk-shaped broaching wheel with two end faces laterally adjoining a circumferential surface of the broaching wheel, the broaching wheel further including a basic body and at least one segment that is mounted circumferentially on the basic body, the segment having at least one cutting-tip holding fixture for holding a cutting tip, each cutting-tip holding fixture including a cartridge that is axially adjustable with respect to the segment by means of an axial clamping wedge, wherein the cartridge at least partially covers the axial clamping wedge in a direction towards the circumferential surface.

9. The tool as claimed in claim 8, wherein the cartridge includes a roof region that projects beyond the axial clamping wedge, the roof region having an orifice that is narrow in comparison with an outer diameter of the axial clamping wedge, the orifice capable of accepting an actuating tool for adjusting the axial clamping wedge.

10. The tool as claimed in claim 8, wherein the axial clamping wedge is accessible from circumferential surface of the broaching wheel in order to adjust the axial clamping wedge by means of an actuating tool.

11. The tool as claimed in claim 8, wherein one of the cutting-tip holding fixtures is formed on the cartridge on one of the two end faces, and wherein another one of the cutting-tip holding fixtures is formed directly on the segment on the other one of the two end faces.

12. The tool as claimed in claim 8, wherein the cartridge covers the axial clamping wedge over at least 90% of an outside diameter of clamping wedge as measured in the axial direction.

13. The tool as claimed in claim 8, wherein the cartridge is secured to the segment by means of a tangential clamping wedge acting on the cartridge in a tangential direction.

* * * * *